United States Patent [19]

Leffert et al.

[11] Patent Number: 4,882,934

[45] Date of Patent: Nov. 28, 1989

[54] ULTRASONIC INSTRUMENT TO MEASURE THE GAS VELOCITY AND/OR THE SOLIDS LOADING IN A FLOWING GAS STREAM

[75] Inventors: Charles B. Leffert, 1302 Wrenwood Dr., Troy, Mich. 48084; Leo H. Weisman, Warren, Mich.

[73] Assignee: Charles B. Leffert, Troy, Mich.

[21] Appl. No.: 157,413

[22] Filed: Feb. 18, 1988

Related U.S. Application Data

[63] Continuation-in-part of Ser. No. 839,033, Mar. 12, 1986, Pat. No. 4,726,235.

[51] Int. Cl.⁴ ............................................... G01F 1/74
[52] U.S. Cl. ............................... 73/861.04; 73/861.26
[58] Field of Search ........... 73/861.04, 861.25, 861.26, 73/861.02

[56] References Cited

U.S. PATENT DOCUMENTS

| | | |
|---|---|---|
| 3,178,940 | 4/1965 | Dahlke et al. . |
| 3,188,862 | 6/1965 | Roth ................................. 73/861.26 |
| 3,204,457 | 9/1965 | Howatt . |
| 3,741,014 | 6/1973 | Tamura . |
| 4,007,754 | 2/1977 | Beck et al. . |
| 4,164,865 | 8/1979 | Hall et al. . |
| 4,176,337 | 11/1979 | Aechter et al. . |
| 4,183,244 | 1/1980 | Kohno et al. . |
| 4,300,400 | 11/1981 | Bistrian, Jr. et al. . |
| 4,336,808 | 6/1982 | Ohno et al. . |
| 4,391,149 | 7/1983 | Herzl . |
| 4,475,406 | 10/1984 | Ansaldi et al. . |
| 4,478,072 | 10/1984 | Brown . |
| 4,483,202 | 11/1984 | Ogura et al. . |
| 4,501,156 | 2/1985 | Kretschmer et al. . |
| 4,509,373 | 4/1985 | Brown . |
| 4,512,200 | 4/1985 | Ghering et al. . |
| 4,558,594 | 12/1985 | Balser et al. ..................... 73/861.25 |

FOREIGN PATENT DOCUMENTS

| | | |
|---|---|---|
| 2160920 | 6/1973 | Fed. Rep. of Germany . |
| 0023924 | 2/1986 | Japan ............................... 73/861.26 |

*Primary Examiner*—Herbert Goldstein

[57] ABSTRACT

A mass flow meter particularly adapted for measuring the mass flow rate of finely divided coal being transmitted through a conduit, for example, as used in large scale fossil fuel power plants. The invention is particularly related to several embodiments of transducer assemblies mounted to the conduit which enable ultrasound pulses to be transmitted across the conduit and detected such that the downstream drift and attenuation of the pulses can be evaluated and correlated to coal concentration and velocity. In a first embodiment, a pair of transducers on variable pitch mounts are located at diametrically opposite positions across the conduit. The transmitting transducer is aimed upstream with respect to the flow and simultaneously the receiving transducer is aimed downstream a corresponding angular amount such that it receives the transmitted pulse in a manner which produces a maximum amplitude output signal. In a second embodiment, a pair of transducer linear arrays are positioned diametrically across the diameter of the conduit. Discrete elements along the linear array are pulsed with a time delay to provide a steerable wave front which traverses the conduit. The received signal is time delayed to reconstruct the angular wave front.

27 Claims, 9 Drawing Sheets

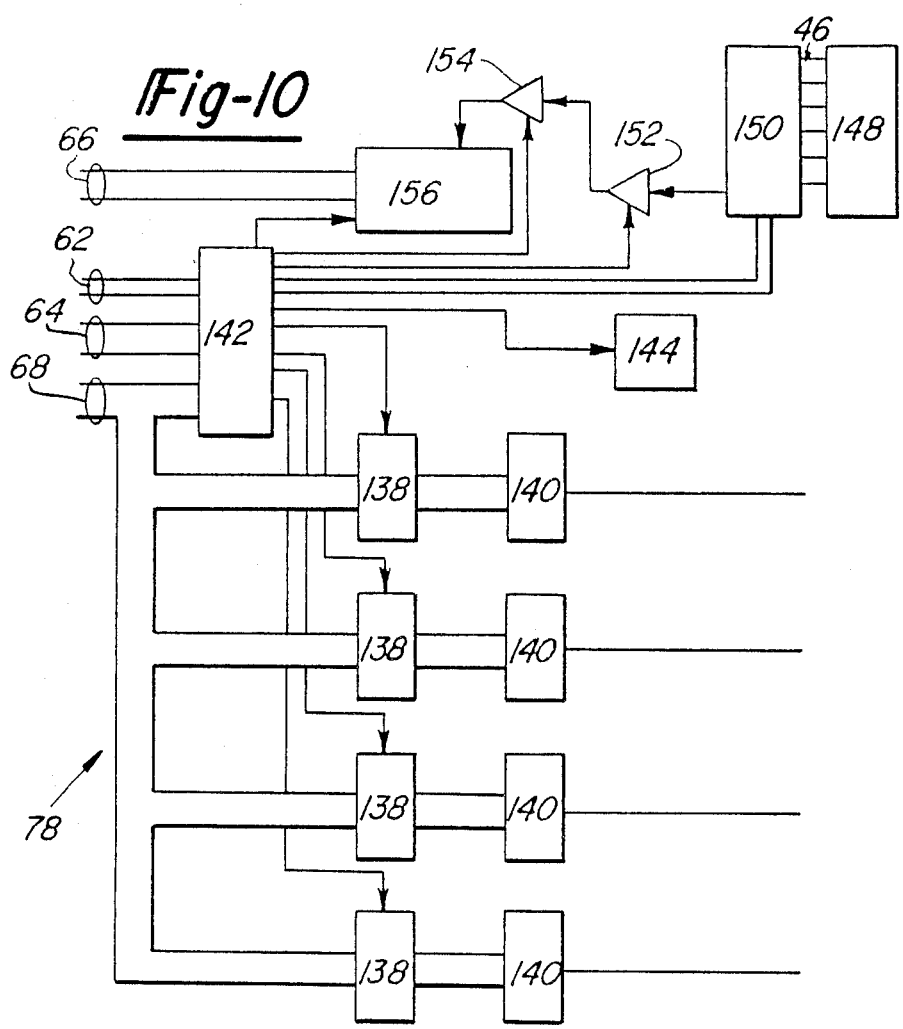
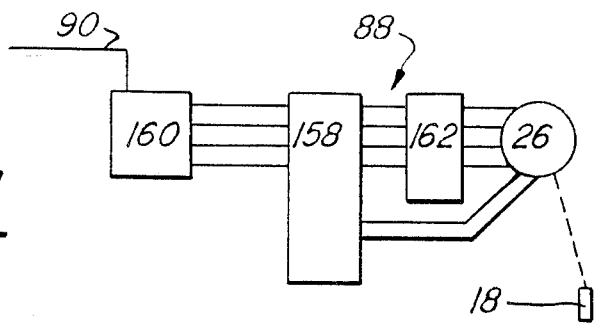

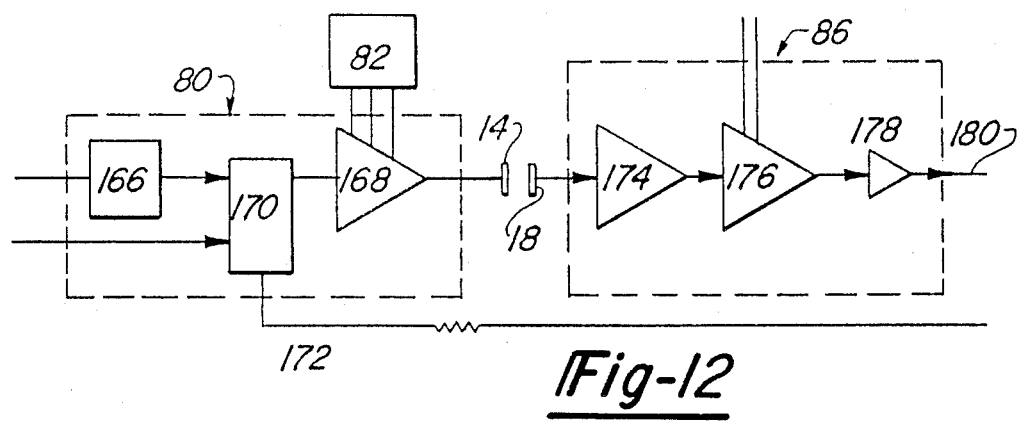
_Fig-12_
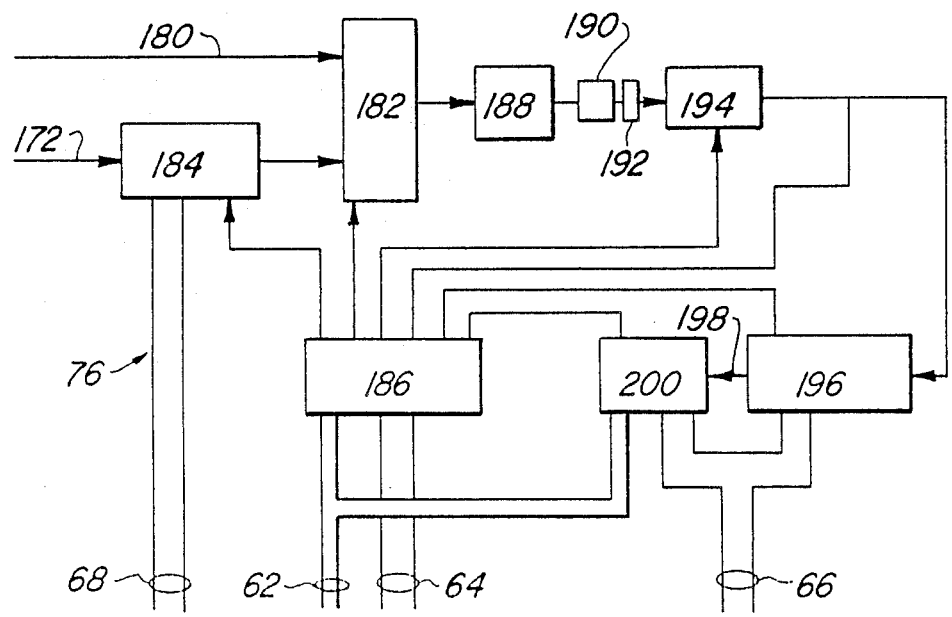
_Fig-13_

ULTRASONIC INSTRUMENT TO MEASURE THE GAS VELOCITY AND/OR THE SOLIDS LOADING IN A FLOWING GAS STREAM

CROSS REFERENCE TO RELATED APPLICATION

This application is a continuation-in-part of application Ser. No. 839,033, filed on Mar. 12, 1986, now Pat. No. 4,726,235, having the same title as this application, and assigned to the assignee of this application.

BACKGROUND AND SUMMARY OF THE INVENTION

This invention relates to an ultrasonic instrument for measuring the mass transport rate of solids suspended in a gas. More specifically, this invention relates to the transport of finely divided solids suspended in a gas in which an ultrasonic signal is used to measure both the solids loading in the gas and the average gas velocity to thereby determine the mass transport rate of both solids and gas.

In coal-fired steam generators of the type typically used in the electric utility industry, coal is pulverized in mills and then transported pneumatically via heated primary air through burner feed lines to a number of burners within the steam generator henceforth referred to as a "boiler". The coal pulverizing mills vary in size, but for the larger boiler installations today, typical operation might involve a feed rate of about fifty tons per hour of coal and one hundred tons per hour of primary air to each mill. The feed coal (usually in lumps about one-half inch in diameter) is typically pulverized to about eighty percent through 200 mesh (74 micron) screen and then the coal-air mixture is blown out of the mill into a number of sixteen-inch diameter pipes which feed burners on the sides of the boiler. A large boiler might have seven such mills each feeding eight burner feed lines, thereby feeding a total of fifty-six burner feed lines.

A significant problem for large-scale coal fired boiler operation arises from non-uniform distribution of the pulverized coal into the burner feed lines. In the above example, one-eight of the output from each coal mill should go into each of the feed lines. Presently, however, no reliable way to determine the actual coal distribution among the various burner feed lines exists. If a burner feed line transports too little coal causing the burner to burn lean, the boiler efficiency is degraded. If a burner feed line has too much coal causing the burner to burn rich, corrosion and fouling of the internal water tubes can occur which can reduce boiler efficiency and lead to costly shutdowns. In present practice, the primary air flow rate (without coal) is balanced with standard pitot-tube type flow meters which are removed before coal is added to the mill. Unfortunately, this method is inaccurate since it does not directly measure coal loading, and further, it suffers the disadvantage that continuous readings during boiler operation are not available.

In view of the foregoing, a reliable on-line instrument is certainly needed for measuring coal loading and mass flow rates in boiler feed lines. Such an instrument could be used to provide an indication of coal loading to enable an operator to take appropriate steps or could be used to directly control coal loading. Development of such an instrument, however, poses serious design challenges due to the harsh flow conditions in burner feed lines since the gas velocity (approximately 30 m/sec.) must be high to prevent the boiler flame from flashing back into the burner feed lines and the coal loading (approximately 0.5 kg coal/kg gas) makes a very abrasive medium in the highly turbulent gas stream.

Over the years, many instruments based on various physical phenomenon have been developed to measure fluid velocities in both single and two-phase flow. In general, those instruments that have been successful have been used in relatively mild fluid environments as compared to the flow conditions for which the present invention is directed. The British have been working on the problem of measuring flow in boiler burner feed lines for about fifteen years. In one system that was developed and tested at a power plant site, the Doppler shift phenomena of an ultrasonic signal was used to determine the gas velocity in a burner feed line and the attenuation of a nuclear generated beam of Beta particles was used to determine the coal loading. A test of the instrument at the power plant site confirmed that the distribution of coal among the burner feed lines from the mill is, in fact, non-uniform. Unfortunately, that instrument package was judged to be not sufficiently reliable for commercial application.

The present inventors turned their attention toward the design of an instrument for measuring the mass flow rate of finely divided coal using ultrasonic waves to determine both gas velocity and solids loading. One of the characteristics of the high-velocity gas flow in a burner feed line in which a mass flow meter must operate that has made the development of an instrument so difficult in the past is the highly turbulent field generated at the high Reynold's Numbers ($Re = 500,000$) which are found in burner feed lines. This characteristic also makes the task of measuring the received ultrasound signals difficult because the sound is scattered by the eddies in the turbulent flow field. Not only do the turbulent eddies attenuate the strength of the sound arriving at the receiving transducer, but it also produces a highly fluctuating signal. Neither of these features facilitate the measurement of either the gas velocity or the solids loading.

Available Energy, Inc. and Detroit Edison Company of Detroit, Michigan, sponsored a study at Wayne State University from 1979 to 1985 of the physical phenomena present in a utility burner feed line. A mock-up of a full-scale (twelve-inch diameter) burner feed line was constructed in the shape of a sixty-seven foot long closed loop. Using mostly commercially available electronic instruments, ultrasonic signals were sent across the flowing gas stream to measure its interaction with the turbulence generated in the pipe and with suspended coal particles. This work led to a published Ph.D. thesis of Dr. Thomas A. Hamade of Wayne State University in 1982 entitled, "Ultrasonic Attenuation in Pipe Flow of Turbulent Gas and Suspended Particles", which is hereby incorporated by reference and will be referred to henceforth as the "WSU-Thesis". The WSU-Thesis work demonstrated that an ultrasound signal could be sent across a large coal-laden gas stream and that the interaction of the sonic waves with the gas turbulence and with the suspended coal particles could be reasonably predicted from existing physical theory. This work also demonstrated that the average gas velocity could be obtained from the expected and well-known downstream drift of the sound signal. The full-scale experimental results were new and contributed to the understanding of turbulence and the interaction of sound with the turbulence and suspended coal particles. However, the transducer mounts, the off-the-shelf electronics, the methods of operating the transducers, and the methods of processing the received signal in combination did not constitute an "instrument" that would produce a readout of either the gas velocity or coal loading. The present invention provides the means to automatically read out on-line the gas velocity and/or coal loading from the interaction of ultrasound waves and the flowing medium, thus providing an instrument suitable for commercial use. An alternate embodiment of an instrument according to this invention would further provide a measurement of the temperature of gas within a conduit by measuring the rate of propagation of an ultrasonic wave through the gas.

In the parent of the present continuation-in-part application, an ultrasonic mass flow meter was described in which a fixed transmitting transducer was used to send a pulsed beam of ultrasound across the diameter of the burner feed pipe. Due to the flow of gases and solids within the conduit, the packet of ultrasound energy becomes displaced downstream as it traverses the pipe. A measure of velocity was obtained by incrementally moving the receiving transducer over a range of longitudinal downstream positions to determine when the received signal was at its highest intensity. This downstream drift is then equated with gas flow velocity. Although this configuration for the transducers operates satisfactorily, it has one very significant disadvantage. Since it is necessary to move the receiving transducer downstream, the burner feed lines must be cut in order to install the transmitting transducer and sliding receiving transducer mount. Since many of utility power plant feed lines are schedule 40, 16-inch diameter pipe, it is very expensive and time consuming to cut such burner pipes. Accordingly, it is desirable to provide a transducer arrangement which simplifies installation for existing burner feed lines.

In accordance with the present invention, two embodiments for improved transducer configurations are disclosed. In a first embodiment referred to as a "variable-pitch" embodiment, a pair of transducers are mounted in ball-and-socket type mounts positioned diametrically opposite each other. The transmitting transducer projects an ultrasound pulse in an upstream direction which drifts downstream with respect to the fluid stream to be captured by the receiving transducer at the diametrically opposite position. The receiving transducer is angled to properly intercept the received wave packet. For this embodiment, only the angles and not the linear (downstream) positioning of the transducers is varied as a means of measuring downsteam drift of the ultrasound packets.

In another embodiment of this invention, termed a "phased-array" embodiment, a pair of transducers are provided positioned diametrically opposite each other. Each transducer is comprised of an array of a number of individually actuated or sensed zones. By employing a phase difference in the energization of the discrete regions of the transmitting array, the resultant ultrasound beam can be aimed or steered upstream at a predetermined and variable angle. Outputs of the individual zones of the receiving transducer array are phase shifted to properly receive the wave packets. Like the first described embodiment, this design significantly reduces costs associated with adapting the mass flow meter of the present invention to existing power plant installations since simple pipe connections can be used to mount the transducers.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 10 is a schematic block diagram of the auxiliary input/output circuitry of the invention.

FIG. 11 is a schematic block diagram of the transducer positioning circuitry of the invention.

FIG. 12 is a schematic block diagram of the transducer driver circuitry of the invention.

FIG. 13 is a schematic block diagram of the gated peak analyzer circuitry of the invention.

DETAILED DESCRIPTION OF THE INVENTION

Specific embodiments of this invention will be described in this section to illustrate the principles of the invention. It will be understood that the invention may be embodied in many other ways without departing from such principles. In an effort to structure this description, there follows separate subsections which describe: the principles of operation, physical elements of the system, electronic circuitry, and method of operation of the systems, respectively.

PRINCIPLE OF OPERATION

Mass flow meter 10 in accordance with this invention measures the velocity and coal loading in a burner feed line by measuring the downstream drift and attenuation of an ultrasonic pulse. Briefly, the theory which permits a measurement of coal loading from these measurements is presented below.

Sound is attenuated according to the exponential relationship:

$$I(Z)/I_O = e^{-\alpha_{tot} Z} \qquad (1)$$

Where $I_O$ = input signal strength to the media,
$I(Z)$ = signal strength at position Z,
Z = distance into the media along the path of the sound, and
$\alpha_{tot}$ = total attenuation coefficient Analysis of data from mass flow meter 10 is based on the assumption that the attenuation of the sound wave can be described by individual attenuation coefficients due to the various physical phenomena that attenuate the sound. It is further assumed for this description that these coefficients are additive, as set forth by the following relationship:

$$\alpha_{tot}(U_d, C_m) = \alpha_g + \alpha_t U_d + \alpha_s C_m \qquad (2)$$

Where: $U_d$ is the average gas velocity across the burner line diameter,
$C_m$ is the coal loading,
$\alpha_{tot}$ is the total attenuation coefficient,
$\alpha_g$ is the attenuation coefficient due to quiet gas,
$\alpha_t$ is the attenuation coefficient due to the turbulence, and
$\alpha_s$ is the attenuation coefficient due to the suspended solids.

A number of experiments were conducted for the above-mentioned three flow conditions. Transducer pairs exhibited an attenuation coefficient of 51 dbm for quiet air compared to 36.2 dbm attenuation coefficient predicted by theory. However, these differences were not considered significant since the transducers used were not pure point sources, and they differed in other ways from the ideal case upon which the predicted value is derived.

Figure 1:
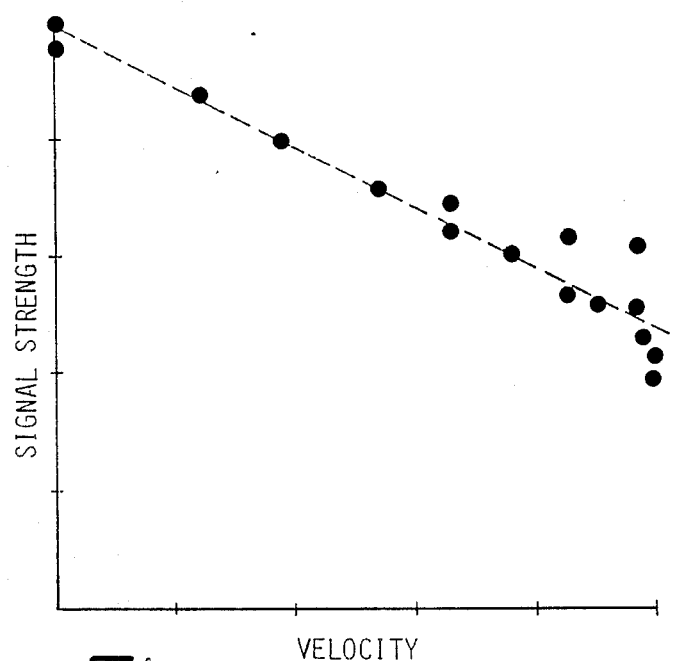
FIG. 1 is a graph of signal strength versus fluid velocity of a gas flowing in a representative conduit wherein no solid loading is present.
Figure 2:
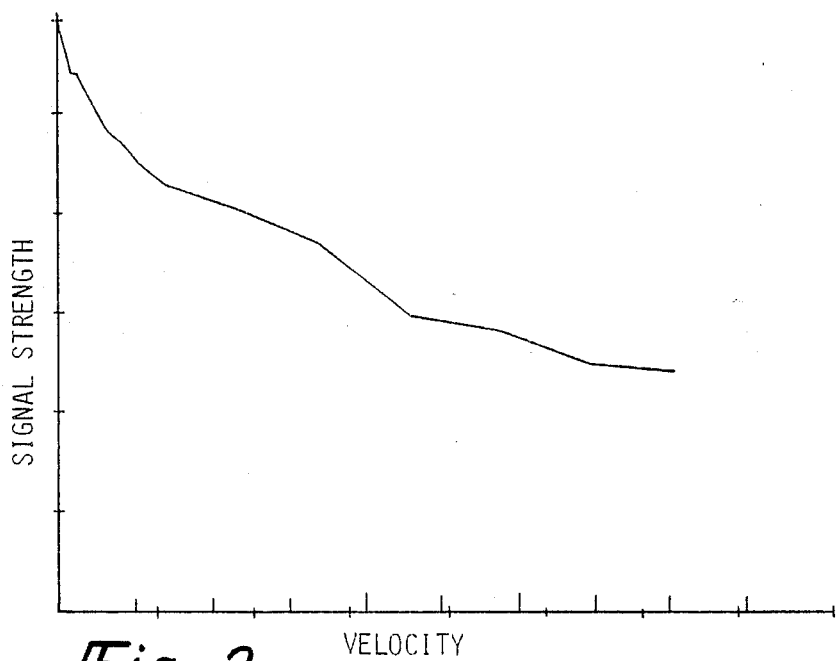
FIG. 2 is a graph of signal strength versus fluid velocity in a conduit wherein a gas is flowing with entrained solids.

A representative signal strength versus average gas velocity $U_d$ relationship is shown in FIG. 1. A representative incremental signal strength versus coal loading $C_m$ is shown by the curve in FIG. 2.

The relationships of the attenuation coefficients explained above can be employed to derive the coal transport rate in a conduit of size $Z = D$ if the average gas velocity $U_d$ is known. The coefficient $\alpha_g$ is known since it is characteristic of the gas; $\alpha_{tot}$ is also known since it is a directly measured value, and $\alpha_t$ is known once the average gas velocity $U_d$ is determined, thereby leaving a single variable $\alpha_s$ which may thus be determined. We want to calculate $C_m$ from $\alpha_s$, so we need to determine $\alpha_{tot}$ both with ($\alpha_{tot} U_d, C_m$) and without ($\alpha' U_d, C_m = 0$) coal loading, i.e. $\alpha_s = \alpha_{tot}(U_d, C_m) - \alpha'(U_d, C_m = 0)$.

An equation or table of values for $\alpha'$ ($U_d, C_m = 0$) is provided from theory or previous measurements at $C_m = 0$. To obtain reliable values of the $\alpha_s$ and therefore $C_m$, it is important to measure reliable values of the signal strength $I_D(Z = D)$ at the receiver and therefore from Eq. 1, to have a reliable and known input signal to the transmitter, $I_o$. A standard reference signal $I_s$ of known intensity is provided and in later discussions considerable circuitry is described from internal calibration of various signals against $I_s$. Computations involving Eq. 1 are actually carried out in terms of logarithmic intensity levels (I.L. in units of decibels, db), i.e. I.L. (db) = $10 Log_{10}(I/I_s)$. In these logarithmic units (db), the I.L. signals are additive such that a $\alpha$ contributor to the signal above a reference level (I.L.R.) is $\hat{\alpha}$ D = I.L.R. − I.L.(D) where (dbm) = $(20/Log_e 10)\alpha(m^{-1})$.

The velocity of the gas and the coal-gas mixture where determined in accordance with the flow meter described in the patent application using the well-known principle of downstream drift of an ultrasonic energy packet due to fluid flow within a conduit. A sound packet leaving the transmitting transducer would take a time set forth by the following equation to cross the diameter D of the pipe and then reach the receiver.

$$t = \frac{D}{C_T} \qquad (3)$$

Where: t is time of flight of ultrasonic pulse sound packet,
D is the pipe diameter, and
$C_T$ is the velocity of sound at a particular fluid temperature T.

If there is flow in the pipe with an average velocity $U_d$, as the ultrasound packet crosses the pipe, it will also be blown downstream a distance as set forth below in equation 4.

$$X0 = \frac{D U_d}{C_T} \qquad (4)$$

Where: X0 is the downstream distance of displacement of the point at which the received sound energy packet is at a maximum, or rearranging terms:

$$U_d = \frac{X0 C_T}{D} \qquad (5)$$

The investigators have found that $C_T$ and the ultrasound drift do not change appreciably due to the presence of coal particles within the fluid stream. For many applications, the gas temperature T is readily measured with a thermocouple and $C_T$ obtained from a single equation $C_T = C(T)$. Note also that if the time of flight (t) can be measured, then since D is known, C(T) can be obtained from Eq. 3 and T from $C_T = C(T)$. Thus, the gas temperature can be measured either by using conventional thermocouples or by measuring the time of flight (t).

Figure 3:
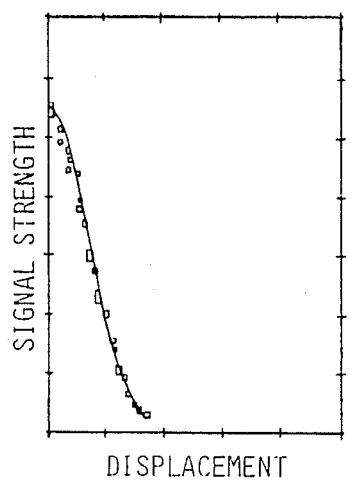
FIG. 3 is a graph of signal strength versus displacement of a receiving transducer with no fluid flow in a representative conduit.
Figure 4:
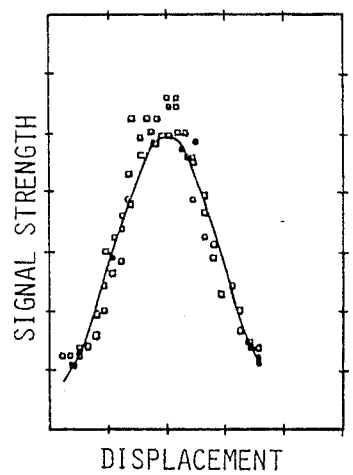
FIG. 4 is a graph of signal strength versus displacement of a receiving transducer with fluid flow but without solid loading in a representative conduit.
Figure 5:
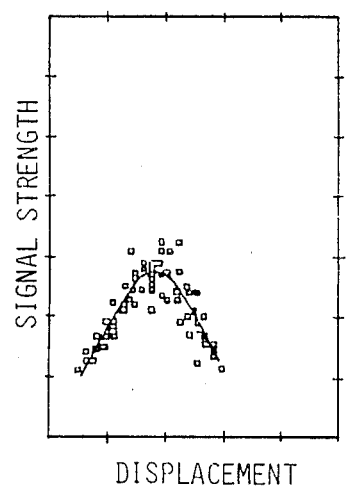
FIG. 5 is a graph of signal strength versus displacement of a receiving transducer with fluid flow and solids loadings in a representative conduit.

In accordance with the embodiment described in the patent application, a receiving transducer is moved to various downstream locations (X) along the longitudinal axis of the pipe to determine the point of downstream displacement at which the received signal is at its maximum, thereby indicating the downstream drift of the ultrasonic energy packet. FIGS. 3, 4, and 5 are representative graphs showing the received signal strength of an ultrasonic packet as the receiving transducer is moved to various downstream (X) positions. FIG. 3 is a graph showing the received signal strength of an ultrasonic energy packet versus displacement (X) of the receiving transducer with no flow through the conduit. As expected, this curve is approximately one-half of a generally Gaussian (normal) distribution where the maximum (termed $Y_{max}$) occurs at zero displacement (X0 = 0) which indicates no downstream drift. The existence of a distribution at zero gas flow conditions is attributable to the sound divergence because of a geometrical factor due to the finite size of the transducers (Fraunhofer region). FIG. 4 is a curve similar to FIG. 3 except that fluid flow through the conduit is present which causes downstream drifting of the ultrasonic energy packet. With fluid flow, the turbulent eddies scatter the sound and the intensity of the $Y_{max}$ is therefore decreased from that of FIG. 3. FIG. 5 is another distribution showing the significant reduction in magnitude of the received signal with the presence of coal suspended in the moving fluid. Added solids in suspension increase the sound absorption and scattering and further decrease the level of $Y_{max}$.

The mass flow meter according to this invention is designed to measure the primary sound beam and not the scattered sound. This is accomplished by pulsing the transmitted sound beam and thus measuring the peak of the first received sound signal.

In accordance with the present invention, several improved transducer configurations are described which simplify the process of mounting and operating the device as compared with the transducers described in the patent application. These new embodiments are termed the "variable pitch" and "phased array" embodiments. The devices, like the transducers taught in the patent application, sense the downstream drift of the ultrasound packets, but enable the transducers to be mounted at fixed axial positions without requiring their longitudinal positions to be movable. These embodiments project the ultrasonic packets upstream with respect to the fluid flow at a predetermined and controllable angle so that these sound packets can be captured by the receiving transducer without requiring its downstream position to be changed.

The principle of operation of the variable pitch transducer embodiment is more subtle than the so-called linear version described by the patent application. For the linear version, as the sound packet crosses the inside diameter (D) of the pipe, it is also blown downstream a distance X0 corresponding to an angle $\theta = \mathrm{ARCTAN}(X0/D)$. For the variable pitch embodiment, the transmitting transducer is held in a ball-and-socket mount such that the transducer face can be aimed over a range of angles ($\theta$) with respect to the mounting diameter of the pipe. The pulses of ultrasound are now aimed upstream at an angle $\theta = \mathrm{ARCSIN}(U_d/C)$. As the pulsed sound packets cross the pipe in time $\Delta t = (D/\cos\theta)/C$, it will have been blown downstream a distance $X0 = U_d\Delta t = U_d D/(C \cos\theta)$. However, the sound must arrive at the opposite pipe wall at the receiving transducer which is directly across from the transmitter (or at another fixed position), therefore, $X0 = D \tan\theta$. Equating the two expressions for X0:

$$U_d = C \sin\theta \qquad (6)$$

If the receiving transducer was mounted in a fixed orientation directly across the diameter of the pipe from the position of the transmitter, the above scheme would not work. The problem with such a fixed receiver mount has to do with the phase of the arriving wave front. When the transmitter is aimed upstream at an angle $\theta_T$ to the pipe diameter, the generated wave front will also arrive at the opposite wall at an angle $\theta$ to the wall. It is desirable for the ultrasound wave front to arrive parallel to the face of the receiving transducer so that all of the elements of the wave front arrive at the same time to be sampled simultaneously. Therefore, in accordance with this invention, the receiving transducer is also aimed at an angle $\theta_R$ to the pipe diameter but in the opposite direction $\theta_R = -\theta_T$. From Eq. (6), the angle $\theta$ depends upon the fluid velocity $\theta_T = \theta_T U_d$, therefore the receiving transducer must also be aimed at various angles $\theta_R = -\theta_T U_d$ depending upon the velocity $U_d$.

As explained in the patent application in which the linear transducer arrangement is used, the influence of turbulence was described which causes the transmitted ultrasound wave front to be scattered such that, at any one X0 position, there is a wide distribution of received signal strengths at the receiving transducer. Accordingly, it was described as necessary to move the receiving transducer over a range of X0 positions while transmitting and receiving a multiplicity of sound pulses and then storing and analyzing this information. Similarly, for the variable-pitch embodiment, a number of data points must also be evaluated for given angular displacements of $\theta_R$ and $\theta_T$.

In addition to the above mentioned advantages, the variable pitch embodiment further enables the transducer's faces to be self-cleaning by interchanging the transmission and receiving roles of the transducers which has the effect of allowing both transducers (alternately) to face upstream such that contaminants are removed by impulse of the on-coming flowing medium.

Another transducer arrangement which avoids the above described problems of implementing the transducer arrangement according to the patent application is referred to as a phased array embodiment. For this embodiment, the transducers are constructed of a number of parallel strips of piezoelectric material bonded together such that the elements are electrically insulated and can be activated or sensed independently. The piezoelectric elements are connected to an ultrasound generator of the transmitter in a manner that a relative phase shift from one element to the next can be electrically and programmably controlled. The radiated beam is accordingly steered at a predetermined upstream angle. The receiving transducer array is similarly an array of sensitive regions and a time delay is introduced to properly "assemble" the received wave front.

PHYSICAL ELEMENTS OF THE MASS FLOW METER

Figure 6:
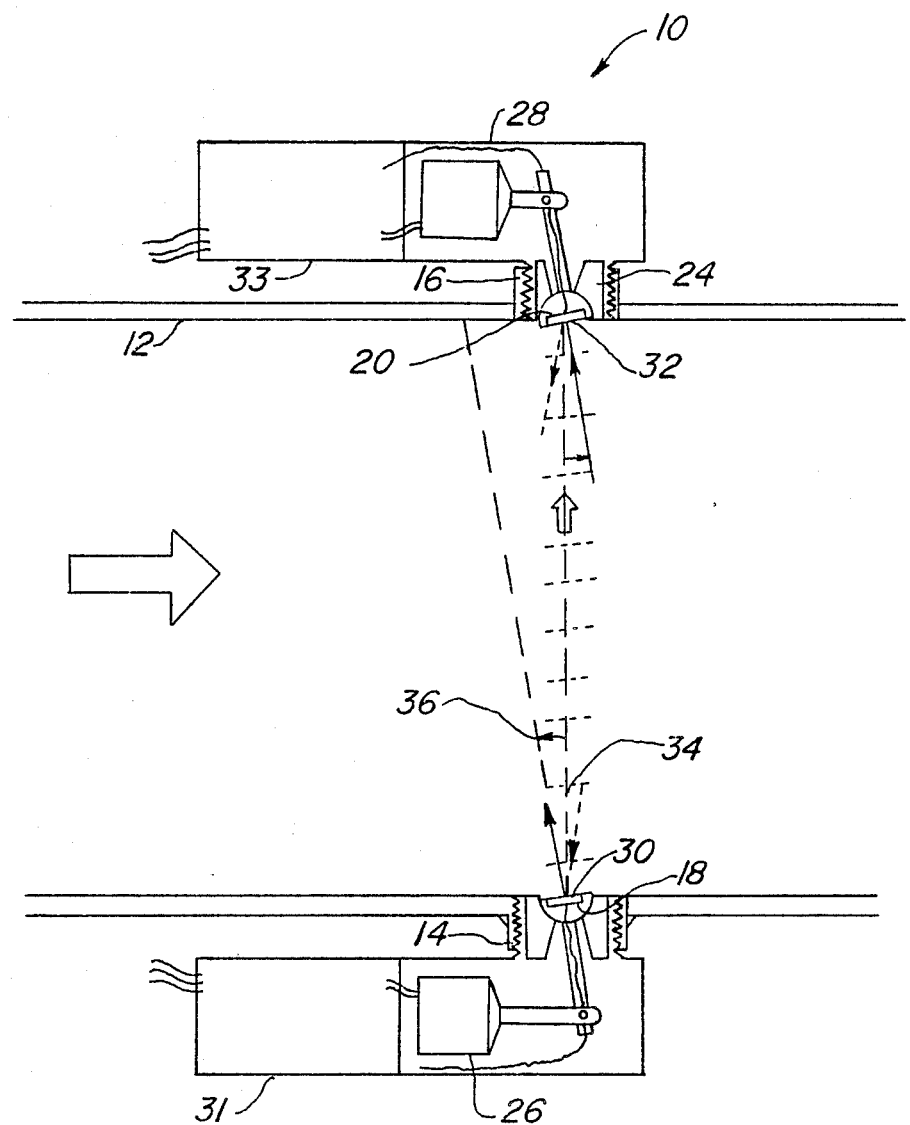
FIG. 6 is a pictorial view of the physical elements of a mass flow meter in accordance with a first embodiment of the invention utilizing variable pitch transducers.

FIG. 6 illustrates a mass flow meter 10 in accordance with the first embodiment of this invention referred to as the variable pitch version. Conduit 12 is shown for conducting a stream of finely divided coal dust entrained within a gas such as air. A pair of pipe couplings 14 and 16 are mounted at diametrically opposed positions of conduit 12 and locally penetrate the side walls of the conduit. Transducers 18 and 20 are mounted in couplings 14 and 16 respectively, and include piezoelectric elements and are mounted to ball-and-socket mounts 22 and 24. Stepper motor translation drives 26 and 28 are coupled to mounts 22 and 24 respectively, and provide a means for changing the angle $\theta$ of the transducer faces 30 and 32. Stepper motors 18 and 20 are controlled by electronic heads 31 and 33.

For the embodiment shown in FIG. 6, transducer 18 is employed as a transmitting transducer and generates packets of ultrasound energy which at angle $\theta_T = T0$ which are aimed along path 36 but according to Eq. 6, actually travel along line 34 which passes through both transducer faces 30 and 32. With the receiving transducer as shown at angular displacement $\theta_R = -\theta_T$, the received signal will be at maximum strength. In order to locate this desired pitch angle $\theta = T0$ for maximum received signal strength, both transducers 18 and 20 are displaced angularly on both sides of $\theta = T0$.

Figure 7:
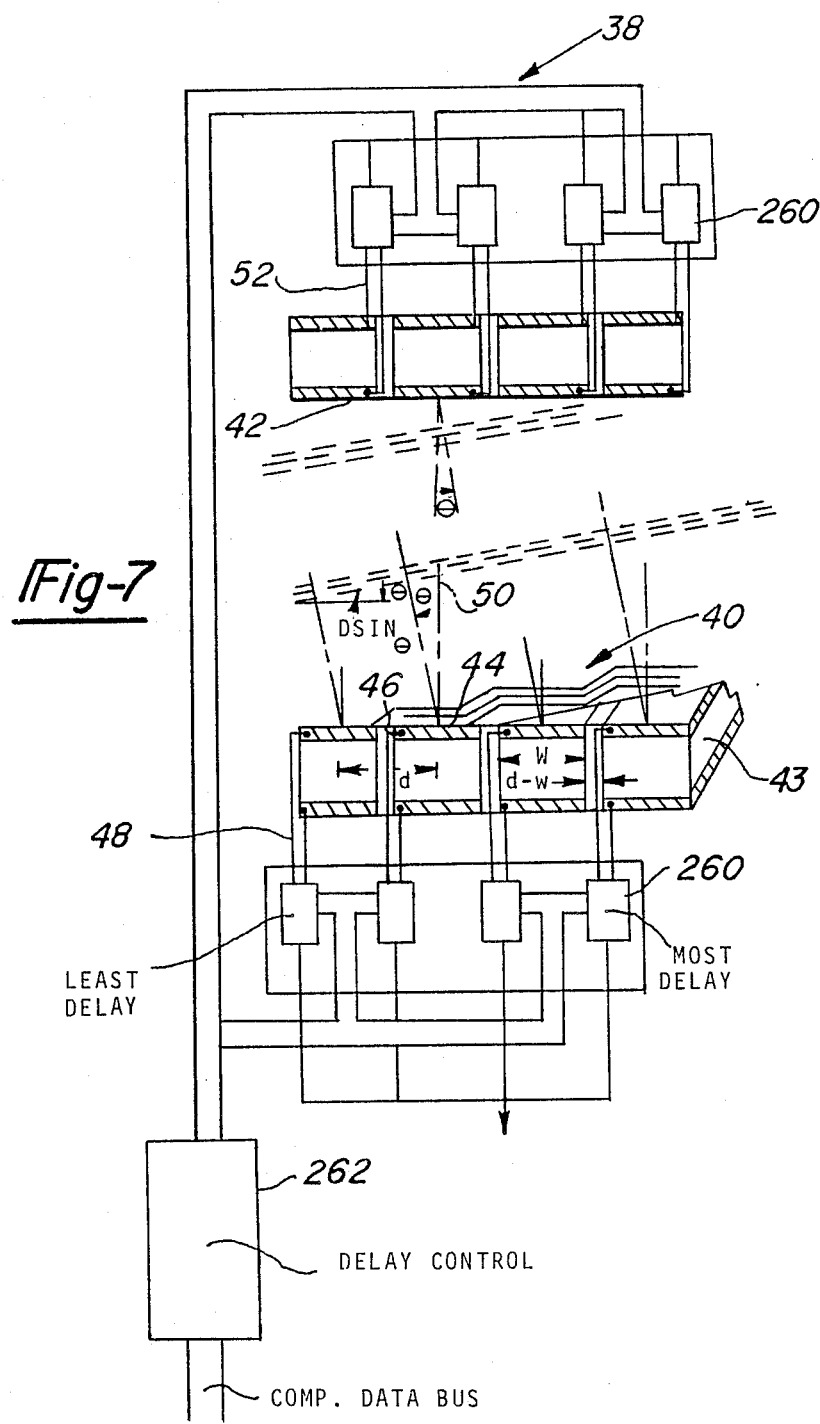
FIG. 7 is a pictorial view of the physical elements of a mass flow meter in accordance with a second embodiment of this invention utilizing phased array transducers.

FIG. 7 illustrates physical elements of a second embodiment of a mass flow meter in accordance with this invention employing a phased array transducer configuration. For this embodiment, identified by reference number 38, a pair of transducer arrays 40 and 42 are positioned at diametrically opposing positions within conduit 12. The arrays are comprised of a number of parallel strips of appropriate transducer (e.g. piezoelectric) material 43 bonded together such that the individual elements 44 can be activated (or sensed) independently. Elements 44 are oriented having a center-to-center distance designated by dimension "d" with the width of the individual elements designated by dimension "w" and the separating insulator 46 width being d-w. Each of elements 34 of transducer array 40 are controlled by individual signal lines 48. As previously explained, a phase shift is employed in the energization of the individual elements 44 to generate a steered resultant beam. As shown in FIG. 7, the upstream angle of the wavefront emanating from transducer array 40 is designated by $\theta$ which is displaced from the diametric center line 50. Signals from individual lines 52 from array 42 are assembled to receive the wave front emanating from array 40. Mass flow meter 38 operates in a fashion generally equivalent to that of mass flow meter 10 previously described in that the ultrasound energy packets are projected in an upstream direction to be captured by a fixed longitudinal position receiving transducer and the angle of projection is swept over a range to provide an energy distribution.

Such a multi-element transducer approximates a linear array of N equal harmonic oscillators with phases $\psi_s = s\psi$. Such an array is known to produce an intensity:

$$I = I_o (\sin^2 N\phi/2)/(\sin^2 \phi/2) \quad (7)$$

where $\phi$ is the phase difference between neighboring oscillators as seen in a particular direction $\theta$:

$$\phi = \psi + 2\pi d/\lambda \sin \theta \quad (8)$$

Such an array will send a zero order (m=o) beam in direction $\theta$ with a strong central maximum if $\theta = 2\pi m = 0$ or:

$$\psi = -2\pi d/\lambda \sin \theta \quad (9)$$

The transducers of resonant frequency f produce sound of wave length $\lambda = C/f$, where C is the speed of sound in the medium. Since $\psi = w_o \Delta t = 2\pi f \Delta t$ then $$\Delta t = -d \sin \theta / C \quad (10)$$

Therefore, to send a sound beam at angle $\theta$, the sound generator must produce a displacement of phase $\psi$ or a displacement of activation time $\Delta t$ between neighboring transducer elements.

A receiving array transducer is made identical to the above except that the elements would be connected to a special receiving amplifier in which the separate voltage signals from each element can be added with separate and adjustable time delays $\Delta t'$. If an ultrasound plane wave arrives at angle $\theta$ to the normal to the transducer face, then a maximum signal strength should be generated when $\Delta t' = -\Delta t$ given by Eq. 10.

As shown in FIG. 7, delay switches 260 are provided to provide the appropriate delay for the individual elements of the transmitting and receiving transducers. Delay switches 260 are controlled by delay controller 262.

With appropriate modifications of the electronics and software this embodiment will function like the variable-pitch embodiment to give the average gas velocity and solids loading except now with added advantages of no moving parts.

ELECTRONIC CIRCUITRY

Figure 8:
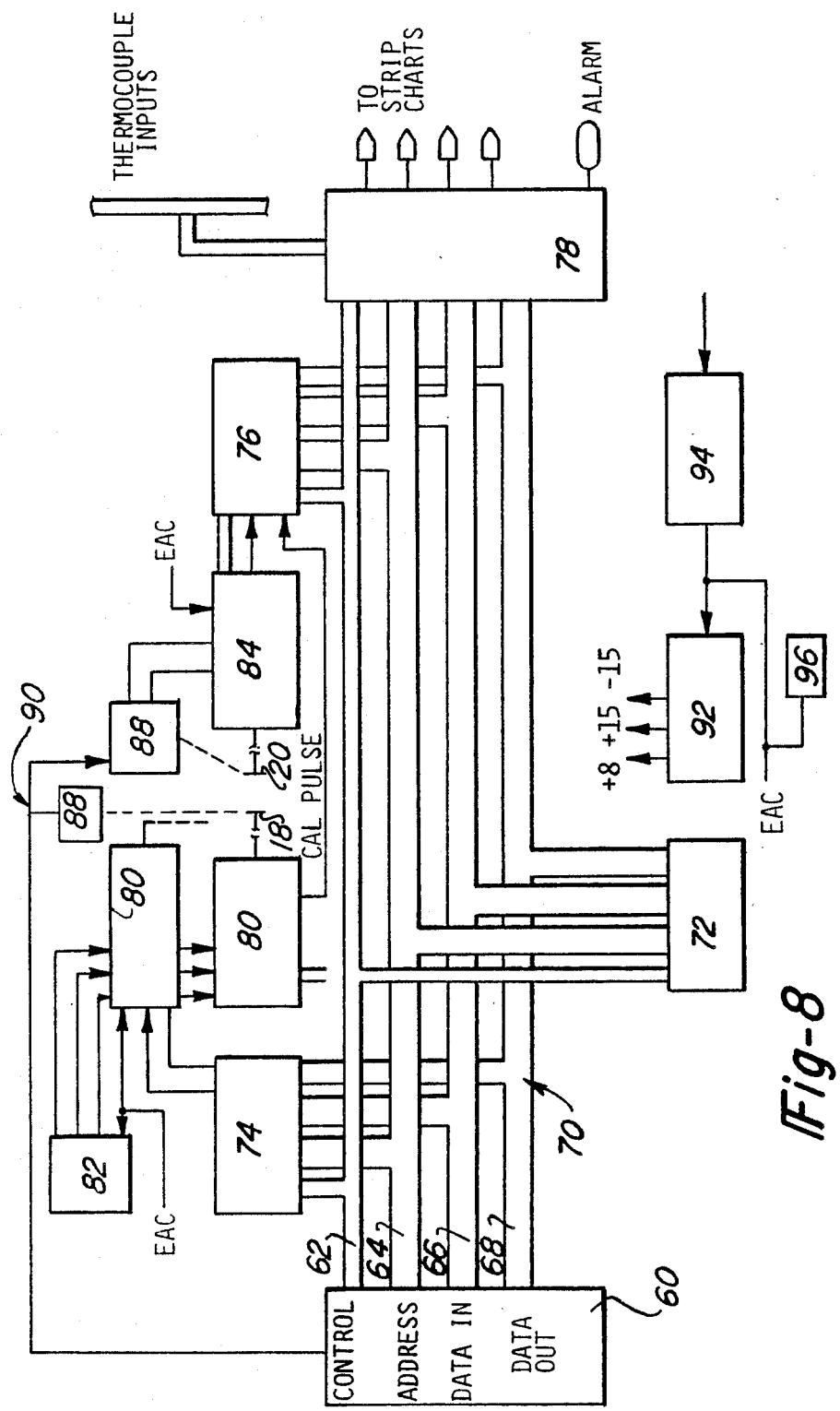
FIG. 8 is a schematic block diagram giving an overview of the computer system of the invention.

The mass flow meter of the present invention is preferably implemented in conjunction with a digital computer such as a microcomputer. The circuitry is described in connection with the variable pitch embodiment previously described and identified by reference number 10. Referring to FIG. 8, a single board S100 bus microcomputer 60 is illustrated for purposes of explaining the invention. While the S100 bus computer system architecture is presently preferred, other types of computers and computer system architectures may also be used in practicing the invention. Microcomputer 60 provides control bus 62, address bus 64, data-in bus 66 and data-out bus 68. These four buses are referred to herein collectively as computer bus 70.

Coupled to computer bus 70 are a plurality of electronic circuits which provide the interface between ultrasonic transducers 18 and 20 and microcomputer 60. Generally speaking, microcomputer 60 controls the angular positioning of the transducers, transmitting, and analyzing of received signals, and providing analyzed data in a convenient form for human or automated evaluation. The programmed set of instructions for causing microcomputer 60 to perform these functions is contained in non-volatile memory 72. Preferably, memory 72 is a bubble memory device providing at least 128K bytes of storage. Non-volatile memory 72 is coupled to computer bus 70, as illustrated.

Also coupled to computer bus 70 is timing circuit 74, gated peak analyzer circuit 76 and auxiliary input/output circuit 78. Timing circuit 74 is illustrated in greater detail in FIG. 9; auxiliary input/output circuit 78 is shown in FIG. 10; transducer position controlling circuit 88 is shown in FIG. 11; power supply is shown in FIG. 12; and gated peak analyzer circuit 76 is shown in FIG. 13. Each of these circuits is more fully discussed below.

With continued reference to FIG. 8, the electronic circuit further comprises power amplifier circuit 80, with associated high voltage power supply 82, for providing high power pulses to be delivered to the transmitting transducer 18 or 20 depending on which is driven (hereinafter transducer 18 is designated to be the transmitter). Also provided is crystal amplifier circuit 84 coupled to receiving transducer 20 for amplifying the received signals before they are fed to gated peak analyzer circuit 76. If desired, more than one pair of transducers may be implemented by multiplexing techniques.

As explained above, the present invention performs mass flow measurements by changing the angular positioning of transducers 18 and 20 to a succession of positions $\theta$, at each position taking data of ultrasonic signal strength. In order to properly position the transducers at the successive positions, transducer position controllers 88 are provided. The controllers 88 are identical and are coupled to both transducers 18 and 20. Controller 88 is responsive to microcomputer 60 via a serial communication line, i.e., the RS232 standard. In FIG. 11, the RS232 communication link is illustrated at 90.

According to common practice, the microcomputer bus 70 has associated with it a power supply 92 which provides the necessary voltages for operating the microcomputer circuits, as well as the electronic circuits of the invention. All electronic circuits can be expected to generate a certain amount of heat through resistive dissipation. In addition, the invention must be adapted for use in furnace rooms and boiler rooms, which often are at elevated ambient temperatures. In order to insure that the circuits will perform in a stable and accurate manner, environmental control circuit 94 is provided. Control circuit 94 provides a thermal sensor and circuit for shutdown of power supply 92 when over temperatures occur. In some applications, environment control circuit 94 may also provide control signals to heat removal device 96. The heat removal device may comprise forced air blowers, refrigeration equipment, or other means for conducting heat away from the circuits of the invention.

Figure 9:
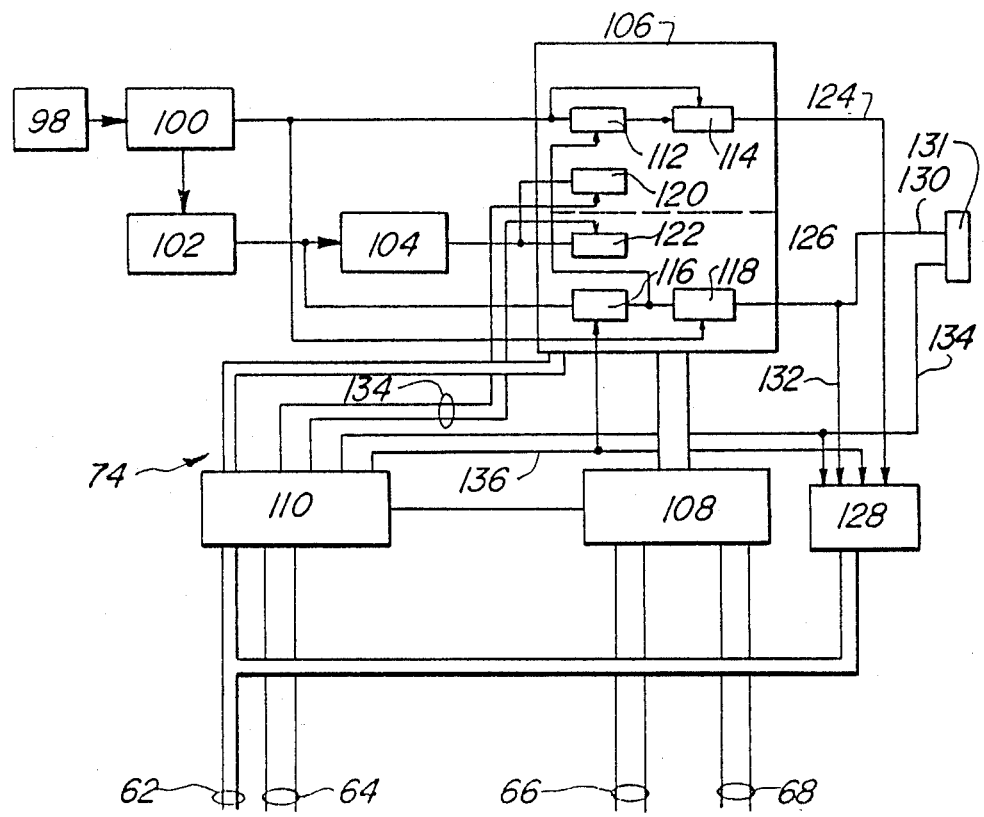
FIG. 9 is a schematic block diagram of the timing circuit of the invention.

Referring next to FIG. 9, the timing circuit will be discussed in greater detail. Timing circuit 74 produces the clock pulses and timing pulses used in generating the transmitted ultrasonic signals and receiving the incoming signals. A stable clock frequency is provided by 16 MHz crystal oscillator 98. The output of crystal oscillator 98 is fed through divide by 2 and divide by 16 circuit 100, to provide a 1 MHz high-frequency reference clock. The 8 MHz output of circuit 100 is fed to a divide by 625 circuit 102 which provides a low-frequency clock at 12.8 kHz. The 12.8 kHz signal is in turn fed through a divide by 128 circuit 104 to provide a 100 Hz reference signal for possible real time operations.

At the heart of timing circuit 74 is programmable counter circuit 106. The programmable counter circuit is preferably implemented using a pair of very large scale integrated circuit (VLSI) multiple 16 bit programmable counters, such as Intel 8253 programmable interval timer integrated circuits. The programmable counter circuit 106 contains a plurality of individually programmable counters which may be programmed to operate in different modes. The internal counters of programmable counter circuit 106 are programmed under software control through bus transceiver 108. Bus transceiver 108 is coupled to data-in bus 66 and data-out bus 68 of computer bus 70. Programmable counter 106 is also responsive to control bus 62 and address bus 64 of computer bus 70 via address decode and control circuit 110. During power up initialization, programmable counter circuit 106 is initialized so that internal timer 112 operates as a hardware triggered strobe. Internal timer 114 is programmed to operate as a programmable one-shot. Internal timer 116 is programmed to operate as a rate generator or divide by N counter. Internal timer 118 is programmed to operate as a programmable one-shot. If desired, internal timers 120 and 122 may be programmed to operate as software timers for producing auxiliary timing signals via bus transceiver 108 and address decode and control circuit 110. As many microcomputers provide software timing functions at the operating system level, these auxiliary software timers may not be required in all applications. The programming of internal timers 112 through 122 is performed by writing control words and data to programmable counter circuit 106 via bus transceiver 108 and address decode and control circuit 110. For additional information concerning programming, reference may be had to the 8253/8253-5 programmable interval timer literature of Intel Corporation.

The programmable counter 106 provides a first output 126 and a second output 124, the first output being the output of internal timer 114 and the second output being the output of internal timer 118. Output 124 provides a delay gate signal, while first output 126 provides the pulse width signal. The delay gate signal is placed on control bus 62 through control bus controller 128. The pulse width signal is supplied to the power amplifier 80 via two alternate routes. The pulse width signal is supplied to an external power amplifier 80 via pulse width line 130, which couples to an external power amplifier jack 131. The pulse width signal is also supplied through pulse width line 132 which is in turn coupled to control bus controller 128. Bus controller 128 in turn places the pulse width signal on bus 62 where it is made available to an internal power amplifier 80' (not shown). Internal power amplifier 80' is assembled on a plug-in circuit board adapted to be coupled directly to the computer bus 70. When internal power amplifier 80' is used, the pulse width signal would normally be supplied to amplifier 80' via pulse width line 132 and control bus 62. In other applications, it may be desirable to use external power amplifier 80 which can be placed remote from the computer bus. In such applications as shown, the pulse width signal is supplied to power amplifier 80 through pulse width line 130 and jack 131.

Also provided on jack 131 is a calibrate/data line 134. A calibrate/data signal is generated by address decode and control circuit 110 and placed on line 134. The calibrate/data signal is also coupled to the calibrate/data line (CA/DA) of computer bus 70 via bus controller 128. The CA/DA line is preferably one of the normally unused control lines of computer bus 70 and carries a logic signal which toggles amplifier 80 between a data mode and a calibrate mode. These modes will be discussed more fully in connection with FIG. 12, described below.

Address decode and control circuit 110 also provides a pair of start/stop lines 135, which carry logic signals for turning software timers 120 and 122 on and off. In addition, the address decode and control circuit provides a go/stop line 136, which is coupled to internal timer 116 and also to control bus controller 128. The go/stop line 136 carries the logic signal which enables and disables internal timer 116. When internal timer 116 is disabled, the pulse width signal at output 126 is suppressed, and hence, no ultrasonic signals are transmitted.

Referring now to FIG. 10, auxiliary input/output circuit 78 comprises a plurality of storage registers 138 and D-to-A convertors 140 coupled to data-out bus 68. The D-to-A convertors 140, provide analog voltages, typically over a 0–10 volt range for driving strip chart recorders, or other analog signal display devices. Each D-to-A convertor and register comprises a data output channel. The channels are individually selected for output under control of address decoder and timer circuit 142. The address decoder and timer circuit is coupled to control bus 62 and address bus 64 in the usual fashion. Also coupled to circuit 142 is alarm device 144 which may be energized under computer control in instances where the operator's attention is required. circuit 78 further comprises a plurality of analog inputs 146, which may be coupled to temperature sensing thermocouple devices 148 used to determine the temperature (or to separate transducers for pressure) at strategic points within the fuel delivery conduit. These measurements may, in turn, be used in analyzing the mass flow data and for correcting temperature (or pressure) dependent effects. For example, as previously described, the speed of transmission of an ultrasonic pulse $C_T$ across conduit 12 is a function of fluid temperature.

As an alternative to measuring temperature by a thermocouple, temperature may be determined if the time of flight of the ultrasonic signal within the gas is known. Such time of flight measurement may be accomplished by using a counter which is incremented by a timing signal, for example, the 16 MHz clock signal between the pulse width signal until an output is sensed from amplifier 84. Such time of flight measurements would be made when the gas is at a known temperature to provide a baseline measurement which would be compared against later measurement to determine gas temperatures. Analog inputs 146 are coupled to multiplexer circuit 150, which selectively interrogates each analog input individually and provides a single output through programmable gain instrument amplifier 152 and sample and hold circuit 154 to an A-to-D convertor 156. The A-to-D convertor 156 is, in turn, coupled to the data-in bus 66. Multiplexer 150 selectively interrogates the analog inputs in accordance with instructions received from control circuit 142, and the gain of amplifier 152 is also controlled by circuit 142.

With reference to FIG. 11, transducer position controller 88 is illustrated. A controller 88 is provided for each of transducers 14 and 15. Controller 88 comprises microcontroller 158, such as Intel integrated circuit 8748. Microcontroller 158 is coupled to the RS232 line 90 via RS232 communication link 160. Microcontroller 158 drives field effect transistor (FET) driver 162, which in turn energizes stepper motor 26. Stepper motor 26 is provided with limit switches which send signals to microcontroller 158 to inform microcontroller 158 when the stepper motor physical limits have been reached.

Power amplifier circuit 80 and crystal amplifier 86 are illustrated in FIG. 12. Power amplifier 80 supplies ultrasonic oscillations to transmitting transducer 18 of 20, while crystal amplifier 86 amplifies signals received by the other transducer. Power amplifier 80 comprises a pulsed oscillator 166 which produces oscillations at ultrasonic frequencies, preferably at 460 kHz. Pulsed oscillator 166 is responsive to the pulse width signal (PW) which is provided either via pulse width line 130 and jack 131 or via line 132 and control bus 62. Preferably, oscillator 166 is configured to produce oscillations which are gated on and off at the pulse repetition frequency (PRF) to produce packets of ultrasonic energy. The pulse repetition frequency is appreciably lower than the 460 kHz ultrasonic frequency and is preferably about 60 Hz. Preferably, the oscillations are gated or produced such that the initial oscillation begins at the zero crossing to prevent spurious harmonics and noise from being produced.

The output of pulsed oscillator 166 is supplied to power amplifier 168 via selector circuit 170. Selector circuit 170 is programmable via the CA/DA (calibrate/data) line of bus 62. In the data mode, the known power signal level is generated by pulsed oscillator 166 and is steered through selector circuit 170 to power amplifier 168. In the calibrate mode, the energy from oscillator 166 is steered through calibrate line 172 to the gated peak analyzer circuit 76 described below. Power amplifier 168 receives high voltage from high voltage power supply 82. The output of amplifier 168 drives transducer 18 into oscillation at ultrasonic frequencies. Preferably, the transducers are tuned at a relatively high Q to oscillate at a predetermined ultrasonic frequency. The frequency of pulsed oscillator 166 is selected to produce strong resonant oscillations in the transducers.

The signal voltage from transducer 18 or 20 used as a receiver (transducer 20 in this example) is amplified in the preamplifier 174, and further, amplified in programmable gain amplifier 176. Preferably, preamplifier 174 provides 50 db of gain while programmable amplifier 176 provides gain in 10 db steps according to control signals sent from gated peak analyzer circuit 76 to crystal amplifier 86, or sent from microcontroller 158 of position controllers 88 (FIG. 11) in applications where amplifier 86 is located remote from the gated peak analyzer circuit. If desired, buffer amplifier 178 may also be included as a means of interfacing the programmable gain amplifier with the gated peak analyzer circuit 76. Circuit 76 is coupled to circuit 86 via lead 180.

Turning now to FIG. 13, the gated peak analyzer circuit 76 comprises multiplexer 182 which receives signal inputs from lead 180 and also from a twelve bit digitally controlled attenuator 184. Attenuator 184 is receptive of calibration signals on calibration line 172 and has a variable attenuation determined by data placed on data-out bus 68. Address decoder and timer circuit 186 is provided to address the attenuator 184 when setting the attenuation level. Circuit 186 also controls multiplexer 182 to select between the received signal on lead 180 or the calibration signal from attenuator 184, depending on whether data or calibration steps are being performed.

The output of multiplexer 182 is coupled to a fast diode circuit 188. In practice, the received signal on lead 180 comprises bipolar oscillations. Fast diode circuit 188 strips the negative going portion of the received signal and boosts or shifts the stripped signal so that the unipolar peak amplitude remains at the same level as the peak-to-peak amplitude of the unstripped received signal. Following the fast diode circuit 188 is analog switch 190 which is gated on and off by the pulse width/delay gate signals on control bus 62. Analog switch 190 is gated on and off to provide a receive window which is open at times when the received signal or calibration signal is expected and closed at other times to eliminate spurious signals and noise. Following analog switch is filter 192, preferably an eighth-order Butterworth filter with staggered poles to produce a steep slope. The output of filter 192 is essentially an envelope waveform of the gated signal. This envelope signal is applied to resettable gated positive peak detector 194 which provides an output voltage level equal to the maximum signal excursion of the input envelope waveform. The output of gated peak detector 194 thus represents the peak-to-peak value of the bipolar envelope received. This value is fed to A-to-D convertor 196, which converts the value into a digital signal for output on data-in bus 66. In general, gated peak detector 194 maintains the maximum peak value until being reset by the end of the conversion (EOC) signal of A-to-D convertor. The rate at which A-to-D convertor 196 converts the peak signal into a digital signal is dependent upon the internal operation of the A-to-D convertor circuit. When the conversion has been completed, A-to-D convertor circuit 196 provides an end of conversion signal (EOC) on end of conversion line 198 to interrupt control circuit 200. Interrupt control circuit 200 generates the interrupt to microcomputer 60 and is also responsive to the go/stop signal which enables and disables the interrupt control circuit. When enabled, the interrupt control circuit allows an interrupt on control bus 62 when the end of conversion signal is received. Microcomputer 60 responds to the interrupt by addressing A-to-D convertor 196 and reading the peak value on data-in bus 66. When the circuit is in the stop mode, interrupt control circuit 200 is disabled and any end of conversion signals will be ignored.

Figure 14:
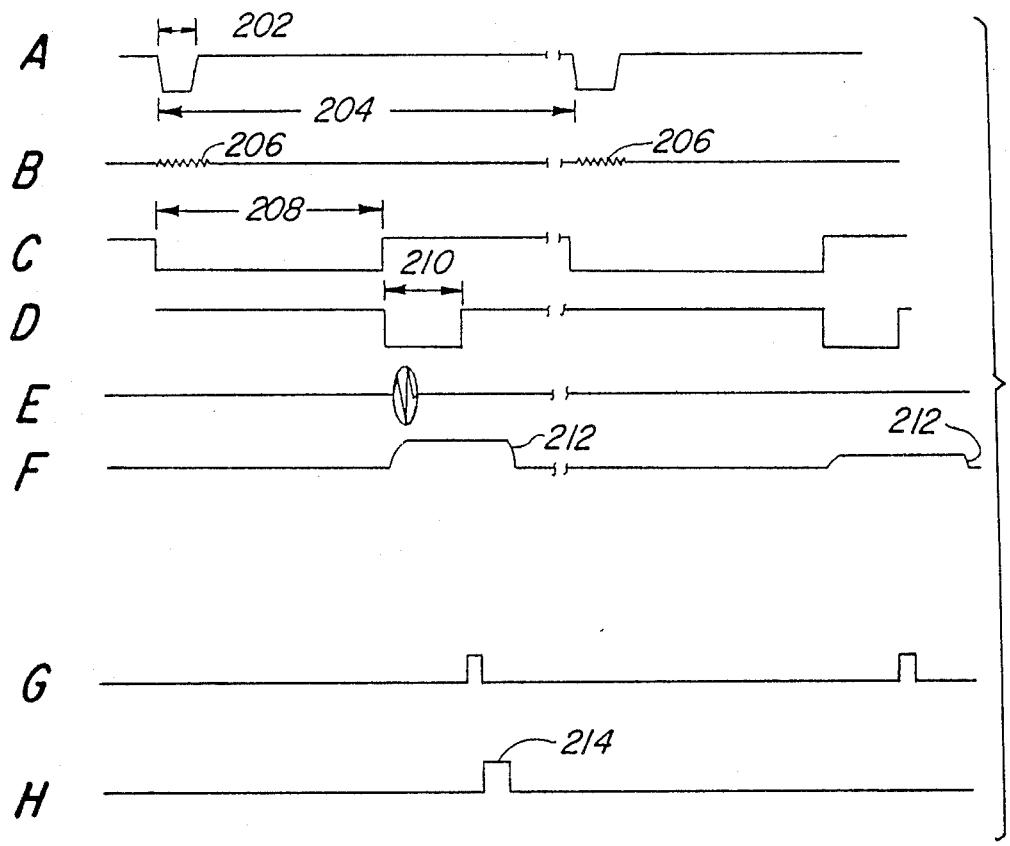
FIG. 14 is a waveform timing diagram useful in understanding the circuits of the invention in operation.

For a better understanding of the circuit in operation, reference may now be had to FIG. 14 which depicts a series of waveforms which illustrate exemplary signals produced by the invention during operation. Line A of FIG. 14 depicts the pulse width signal produced by internal timer 118 of programmable counter 106. The pulse width 202 determines the length of time during which each packet of ultrasonic oscillations is produced. Repetition interval 204 determines the pulse repetition frequency (PRF) or rate at which the ultrasonic packets are transmitted. Line B illustrates the transmitted waveform as a series of packets 206 of ultrasonic energy. Each packet comprises oscillations at the ultrasonic oscillator frequency, preferably 460 kHz. Line B thus represents the output waveform of pulsed oscillator 166.

Line C is the delay signal used in generating the delay gate signal on Line D. The delay signal is essentially a square wave signal which changes state in a first direction in synchronism with the leading edge of the pulse width signal on Line A. The delay signal changes to a second state after a predetermined delay 208. The length of delay 208 is determined by internal timer circuits 112 and 114 of programmable counter 106. The delay time may be changed during operation of the invention under software control through the data-out bus 68. The pulse width signal on Line A and the delay signal on Line D are in synchronism because both are derived from 16 MHz oscillator 98. Line D depicts the delay gate signal, which occurs in synchronism with the trailing edge of the delay signal on Line C. The delay gate time 210 is controlled by internal timer 114 and defines a receive window at a predetermined time interval (interval 208) after the transmitted pulse is sent. The receiver circuitry is active only during this window, so that spurious signals and noise occurring at other times do not affect the accuracy of the mass flow measurements.

Line E depicts an exemplary received signal waveform. The received signal may be considerably distorted due to turbulent eddy and particle scattering and absorption of the sound. To insure robust data despite these signal level fluctuations, the invention normally takes many data samples at each transducer position. An averaging or other statistical process is performed numerically on the received data samples to determine a statistically significant data point at each physical location.

Line F depicts the output of the gated peak detector 194. Note that the leading edge of the waveform of Line F is curved, following the contour of the leading edge of the envelope of the received waveform of Line E. Once the peak of the envelope is reached, the output of gated peak detector 194 remains at a constant peak level until being reset as at 212.

Line G depicts the start of conversion signal used to activate A-to-D convertor 196. The start of conversion signal is timed to occur after the delay gate signal has ended, i.e. after the receive window is closed. In this fashion, the A-to-D convertor is certain to receive valid data and is unaffected by spurious signals and noise occurring outside of the window. The end of conversion signal on Line H, indicated by the trailing edge of pulse 214, signals interrupt control circuit 200 when A-to-D convertor 196 has completed its conversion. Using presently available commercial A-to-D convertors, the conversion time may be on the order of ten microseconds. The conversion time is not critical, provided the repetition interval 204 is long enough so that data from a first cycle has been analyzed and input to microcomputer 60 before the second cycle begins.

Data are taken at each of the successive transducer 18 and 20 angular positions $\theta$ in the fashion described above. Preferably, a plurality of separate ultrasonic packets of energy are transmitted and received for each physical transducer angle, and the analyzed data values are statistically processed, as by averaging, for example, to develop one data value for each position. The data values and physical locations may be stored in an array in the memory of microcomputer 60 where further analysis is performed based on the data in the entire array.

In general, the data values stored in the array represent ultrasonic power levels or signal strengths at various transducer angles $\theta$. When a sufficient number of samples are taken at each physical location, the data values give a statistically significant indication of the signal strength at that particular ($\theta$) position. Depending upon the flow rate, the signal strength values will typically fall along a Gaussian (normal) distribution versus the position of transducer 18 having a peak at an angle determined by the fluid velocity. In applications where a Gaussian distribution is observed, it is only necessary to take sufficient data points to establish the position and magnitude of the peak of the distribution. For the fluctuating signal in turbulent flow, it is necessary that the data set actually includes the peak.

The range of travel can be fixed or, for a slowly varying gas velocity, this condition is readily implemented since range of translation drives 26 and 28 for position ($\theta$) can be adjusted using the peak calculated from the previous data set. The direction of motion of the receiving transducer 20 is also stored in case it is needed in the subsequent analysis of the data.

For mass flow meter 38 using phased array transducers 40 and 42, the electronics would be modified to replace transducer position controllers 88 with phase shifting circuits for both arrays, as previously described.

METHOD OF OPERATION

For mass flow meter 10 of the variable pitch configuration, one of transducers 18 or 20 is driven by amplifier 80 to produce sonic wave packets at a frequency of 460 kHz and is gated on for a period of about 20 microseconds thereby producing about nine individual sound waves. The 20 microsecond on period is repeated at a pulse repetition frequency (PRF) of e.g. 60 Hz.

The computer program stored in memory 72 which controls microcomputer 60 automatically simultaneously angularly moves transducers 18 and 20 through a preset number of steps (about 30) through a preset range of $\theta$, pausing after each step long enough to measure and store the received strength (Y) a desired number of times (preferably about 50) from which it then computes and stores an average value $Y_n$. At the end of the sweep through the range of $\theta$, the computer program calculates from the stored values $(\theta_n, Y_n)$ values for $\theta 0$ and $Y_{max}$ and then, using these values and a measurement of the temperature T and other stored information, it calculates and displays (and/or records) values for the average fluid velocity $U_d$, the solids loading $C_m$, the air mass flow rate AMFR = $U_d(\pi D^2/4) \rho_g$ and the solids mass flow rate SMFR = $C_m$ (AMFR) where $\rho_g$ is the density of the gas. The program then reverses the direction of angular travel of transducers 18 and 20 and repeats these steps while moving in the opposite direction. Values of $U_d$, $C_m$, AMFR and SMFR are updated about every 30 seconds, but could be updated at a much faster rate if desired.

The values described above are determined and calculated by completing the mutual tasks set forth below:

(1) Move transducers 18 and 20 by position controllers 88 in the range of reception of the ultrasound beam to the $(\theta_n)$ position;

(2) Generate a pulsed AC voltage signal of ultrasound frequency;

(3) Drive transmitting transducer 18 by amplifier 80 to generate a packet of ultrasound and aim it across conduit 12 containing the flowing medium to be characterized;

(4) Convert the ultrasound maximum level of power received by receiving transducer 20 to an AC voltage signal;

(5) Measure the received signal strength Y(m) produced by amplifier 84 and convert the value to a digital form and store it in the memory of microcomputer 60. Repeat this step M-times at a particular $\theta(n)$ location, calculate the average value of the Y(m) and store it in microcomputer 60 memory as the n-th average value, Y(n);

(6) Repeat steps (1) through (5) n-times at various positions $\theta(n)$ storing the $\theta$ position and signal strength pairs ($\theta(n)$, Y(n)) in memory;

(7) Perform numerical finite difference calculations on the $\theta(n)$, Y(n) values to determine $\theta 0$, and $Y_{max}$ where $\theta 0$ represents the angular position of the transducers where the signal strength is maximum, $Y_{max}$;

(8) From the value $\theta 0$ and existing theory, compute the value of the average gas velocity, $U_d$;

(9) From the value of $Y_{max}$ and the known calibration of amplifier 84, compute the total attenuation coefficient$\alpha_{tot}$ ($U_d$, $C_m$) in dbm of the ultrasound with the suspended particles and from the difference over that with zero particle loading (known from calibration), calculate the attenuation coefficient due to just the suspended particles $\alpha_s = \alpha_{tot}(U_d, C_m) - \alpha'(U_d, C_m=0)$ (where $\alpha'(U_d, C_m=0) = \alpha_g + \alpha_t$.

(10) From the value$\alpha_s$ and existing theory, compute the solids loading of the gas, $C_m$, and display it and the gas velocity, $U_d$ and values of AMFR and SMFR for the operator;

(11) Return to step 1 to start the cycle over again and continue to update the $C_m$, $U_d$, AMFR and SMFR readings once in about very 30 seconds.

Using the above-described theory, physical elements, electronics and method of operation, a mass flow meter 10 which enables continuous measurement of the mass transport rate of coal in a feed line is provided. The measured values of coal transport rate may be used to provide a readout for an operator, or may be further directly coupled to a control system for control of valves or other devices which modulate coal loading. In either case, mass flow meter 10 enables the operators of coal fired plants to increase the efficiency of operation by enabling close control over boiler coal feed rates to the individual burner feed lines.

Mass flow meter 10 having the variable pitch transducers can also be operated in an alternate approach which enables the faces of transducers 18 and 20 to be periodically cleaned. During operation, very fine coal particles tend to drift onto the receiving transducer which temporarily decreases the signal strength output. Transducers 18 and 20 are physically and electrically identical as mentioned previously. Accordingly, either can be used for a transmitter or receiver, only the software needs to be written to step their angular displacements in opposite directions. The only additional hardware that would be required would be relays or switching systems (not shown) to appropriately direct signals from the ultrasonic generator and receiver to the appropriate transducer. In an example operational procedure, the roles of transducers 18 and 20 would be periodically reversed. Operation would begin in a so-called "normal" mode in which transducer 18 acts as a transmitter and transducer 20 acts as a receiver. Transducers 18 and 20 would begin at a "null" angular displacement where $\theta = 0$ in which they are directed diametrically across the conduit 12.

For medium velocity $U_d$ a sweep range of velocity $U_o \pm \Delta U$ is set corresponding to a sweep range of angular displacement of $\theta_o \pm \Delta \theta$. First, for the normal mode transducer 18 is moved to displacement $\theta_o - \Delta \theta$, and transducer 20 to $\theta_o + \Delta \theta_o$. Transducer 18 is pointing upstream and transducer 20 is pointed downstream. Both transducers are then stepped through their preset ranges moving alternatively in small increments and pausing for a short time between stops to send and receive M ultrasound pulses as taught in the patent application. Transducer 18 steps to greater (absolute) angles upstream and transducer 20 to greater angles downstream. After the normal mode sweep is finished, the transducers return to the null position. If during this normal mode sweep some fine solids particles had drifted onto the face of transducer 20 and had not been completely cleared at the null position, then it should be cleared in the following reverse mode sequence.

After completion of normal mode, switches are activated to connect the ultrasonic generator (power amplifier 80) to transducer 20 and the ultrasonic amplifier 86 to transducer 18 to start the reverse-mode cycle. Transducer 18 is now moved to angular displacement $\theta_o - \Delta \theta$ pointing upstream and transducer 20 to $\theta_o + \Delta \theta$ pointing downstream. Transducer 20 is stepped to greater (absolute) angles upstream and transducer 18 to greater angles downstream with data taking pauses as before, and then both transducers are returned to null positions to complete the reverse-mode cycle. If any fine particles had remained on the transducer 20 after the normal mode cycle they should have been blown clear as that transducer was aimed upstream in the reverse mode.

After completion of the reverse mode, the instrument is automatically switched back to the normal mode where any particles deposited on transducer 18 during the reverse mode should be cleared. The instrument continues to automatically cycle between modes displaying measurements of velocity, solids loading and mass flow rates alternatively of normal and reverse modes.

In addition to the above self-clearing action provided by normal and reverse modes for transducers 18 and 20, such operation also provides a check of proper operation of the instrument. For stable flows of a well-dispersed solids-in-gas stream; the normal and reverse mode outputs should be the same. If the medium is known to be stable and dispersed then the normal and reverse mode output values provide an internal check on the instrument calibration constants and operation. If the stability/dispersion of the flowing medium is suspect then the instrument may be giving additional information on the unstable/segregated flow. The instrument should then be checked with gas flow and zero solids loading. With a change to gas flow and zero solids loading, if the instrument outputs agree for normal and reverse mode output values, then the previous non-agreement indicates unstable and/or segregated flow. If, at gas flow and zero solids loading, the normal and reverse mode output values still do not agree, then either unstable gas flow persists or the instrument transducers need to be checked at zero flow.

With a change to zero flow and a change of sweep range near $\theta_o=0$ the transducers 18 and 20 can be operated in both modes. If the instrument output values for both modes are now consistent, then unstable gas flow is indicated for the previous gas-flow zero-solids operation. If the normal and reverse mode output values still do not agree, then either a malfunction of one of the transducers is indicated or the zero-flow constants need updated for slight misalignment of the welded pipe couplings. If the output values agree but give positive indication of gas flow, then conduit 12 should be carefully checked for such as defective valves.

The instrument is self-calibrating for the zero flow constants which compensate for slight coupling misalignment precisely by the last operation described above where at zero flow the calibration constants are adjusted to give normal and reverse mode output velocity values equal to zero.

The method of operation of mass flow meter 38 using phased array transducers proceeds in a manner similar to that of the variable pitch version in that packets are projected over a range of upstream angles with numerous data points being analyzed at each position.

While the above description constitutes the preferred embodiments of the present invention, it will be appreciated that the invention is susceptible to modification, variation and change without departing from the proper scope and fair meaning of the accompanying claims.

We claim:

1. An instrument for measuring the velocity of a fluid being transported through a conduit comprising:
   a first ultrasound transducer defining an aiming line,
   first coupling means for mounting said first transducer to said conduit and for enabling the angle of said first transducer aiming line to be varied,
   a second ultrasound transducer defining an aiming line;
   second coupling means for mounting said second transducer to said conduit and for enabling the angle of said second transducer aiming line to be varied,
   actuation means for controlling said aiming line angles of said first and second transducers such that said first transducer aiming line can be displaced upstream with respect to said fluid flow, and said second transducer aiming line is simultaneously displaced downstream with respect to said fluid flow, and
   controlling and processing means for causing said first transducer to generate a packet of ultrasound energy which traverses said fluid flow and which is detected by said second transducer whereby the angular displacement of said first transducer aiming line is related to the downstream drift of said packet of ultrasound energy caused by said fluid velocity and said controller and processing means further for determining said velocity.

2. An instrument for measuring according to claim 1 wherein said first and second transducers have generally planar face surfaces with said aiming lines being normal to said face surfaces.

3. An instrument for measuring according to claim 1 wherein said transducers can be oriented in initial positions at which said aiming lines lie within a diametric center plane of said conduit.

4. An instrument for measuring according to claim 1 wherein said actuation means further controls said aiming line angles to orient said first transducer aiming line upstream with respect to said flow and to simultaneously orient said second transducer aiming line downstream with respect to said flow and wherein said controller and processing means further causes said first transducer to generate a packet of ultrasound energy which is detected by said second transducer.

5. An instrument for measuring according to claim 4 wherein said actuation means displaces said first and second transducers through a range of angles wherein said first transducer aiming line is displaced upstream at an angle equal to the downstream angular displacement of said second transducer.

6. An instrument for measuring according to claim 1 wherein said instrument further measures the mass flow rate of solids suspended in said fluid and wherein said controller and processing means measures the attenuation of said packets of ultrasound energy traversely said fluid which is related to the concentration of said solids and wherein said controller and processing means determines said mass flow rate by evaluating said concentration and fluid velocity.

7. An instrument for measuring according to claim 1 wherein said at least one of said first or second transducers comprise a variable pitch mount coupled to said actuation means to change the orientation of said transducer and said aiming line.

8. An instrument for measuring according to claim 7 wherein said actuation means comprises at least one stepper motor coupled to at least one of said first or second transducers.

9. An instrument for measuring according to claim 1 wherein at least one of said first and second transducers comprises an array of piezoelectric elements which act as independent ultrasound transducers.

10. An instrument for measuring according to claim 9 wherein said first transducer is operated as a transmitter and said actuation means activates said elements with a phase shift to enable the angle of said aiming line to be changed.

11. An instrument for measuring according to claim 10 wherein said second transducer is operated as a receiver and said actuation means provides a phase shift for received signals from said elements to assemble a signal transmitted by said first transducer.

12. An instrument for measuring the mass flow rate of solids suspended in a gas being transported through a conduit comprising:

an ultrasound transmitter for generating a pulsed ultrasound beam and defining an aiming line, first coupling means for mounting said transmitter to said conduit and for enabling the angle of said transducer aiming line to be varied, an ultrasound receiver for detecting the strength of signals generated by said transmitter and defining an aiming line, second coupling means for mounting said receiver to said conduit such that said receiver and said transmitter are spaced whereby said beam travels across said conduit and said signal strength is influenced by the concentration of said solids in said conduit and for enabling the angle of said receiver aiming line to be varied, variable positioning means for positioning said aiming line angles such that, in a reference position, said aiming lines are coaxial, and in a displaced position, said transmitter aiming line is displaced upstream with respect to said fluid flow, and said receiver aiming line is displaced downstream with respect to said fluid flow enabling sensing of the downstream drift of said ultrasound beam whereby the velocity of said gas in said conduit may be determined, controlling and processing means for setting said transmitter and said receiver aiming lines at a first relationship, and causing said transmitter to generate said ultrasound beam, measuring the signal strength of said beam received by said receiver, storing a value representative of said first relationship and said received signal strength, setting said aiming lines of said transmitter and said receiver to a plurality of other angularly displaced positions, thereby generating signal strength data for each of said relationships, calculating the gas velocity by the relationship at which the received signal strength is at a maximum, and calculating the loading of said solids by the signal strength at said maximum.

13. An instrument for measuring according to claim 12 wherein said first and second transducers have generally planar face surfaces with said aiming lines being normal to said face surfaces.

14. An instrument for measuring according to claim 12 wherein said controller and processing means further controls said aiming line angles to orient said first transducer aiming line upstream with respect to said flow and to simultaneously orient said second transducer aiming line downstream with respect to said flow and wherein said controller and processing means further causes said first transducer to generate a packet of ultrasound energy which is detected by said second transducer.

15. An instrument for measuring according to claim 14 wherein said actuation means displaces said first and second transducers through of range of angles wherein said first transducer aiming line is displaced upstream at an angle equal to the downstream angular displacement of said second transducer.

16. An instrument for measuring according to claim 12 wherein said at least one of said first or second transducers comprise a variable pitch mount coupled to said actuation means to change the orientation of said transducer and said aiming line.

17. The instrument according to claim 16 wherein said variable positioning means comprises stepper motors coupled to said transmitter and said receiver.

18. An instrument for measuing according to claim 12 wherein at least one of said first and second transducers comprises an array of piezoelectric elements which act as independent ultrasound transducers.

19. An instrument for measuring according to claim 18 wherein said first transducer is operated as a transmitter and said actuation means activates said elements with a phase shift to enable the angle of said aiming line to be changed.

20. An instrument for measuring according to claim 19 wherein said second transducer is operated as a receiver and said actuation means provides a phase shift for received signals from said elements to assemble a signal transmitted by said first transducer.

21. An instrument for measuring the velocity of a fluid being transported through a conduit comprising:

a linear array of discrete ultrasound generators, controller means for energizing said ultrasound generators with a transmitter phase difference to develop a steerable ultrasound wave front which passes through said fluid, a linear array of discrete ultrasound receivers, receiving means for receiving signal from each of said receivers and assembling them with a predetermined receiver phase difference to detect said ultrasound wave front emanating from said generators, and controller means for setting said transmitter phase difference and said receiver phase difference to maximize the signal strength of the received wave front, and for sweeping through a range of phase differences to direct said ultrasound wave front upstream relative to said ultrasound receivers to evaluate the downstream drift of said wave front caused by said velocity thereby enabling the evaluation of said fluid velocity.

22. An instrument for measuring the mass flow rate of solids suspended in a gas being transported through a conduit comprising:

an ultrasound transmitter for generating a pulsed ultrasound beam and defining an aiming line, a first variable pitch mount for mounting said transmitter to said conduit and for enabling the angle of said transducer aiming line to be varied, an ultrasound receiver for detecting the strength of signals generated by said transmitter and defining an aiming line normal to said face, a second variable pitch mount for mounting said receiver to said conduit such that said receiver and said transmitter are spaced whereby said beam travels across said conduit and said signal strength is influenced by the concentration of said solids in said conduit and for enabling the angle of said receiver aiming line to be varied, variable positioning means coupled to said transmitter and receiver for positioning said aiming line angles such that, in an initial position, said aiming lines are coaxial, and in a displaced position, said transmitter aiming line is displaced upstream with respect to said fluid flow, and said receiver aiming line is displaced downstream with respect to said fluid flow enabling sensing of the downstream drift of said ultrasound beam whereby the velocity of said gas in said conduit may be determined, controlling and processing means for setting said transmitter and said receiver aiming lines at a first relationship, and causing said transmitter to generate said ultrasound beam, measuring the signal strength of said beam received by said receiver, storing a value representative of said first relationship and said received signal strength, setting said aiming lines of said transmitter and said receiver to a plurality of other angularly displaced positions, thereby generating signal strength data for each of said relationships, calculating the gas velocity by the relationship at which the received signal strength is at a maximum, and calculating the loading of said solids by the signal strength at said maximum.

23. A method of measuring the velocity of a fluid being transported through a conduit comprising the steps of:

providing a first ultrasound transducer defining an aiming line, providing a second ultrasound transducer defining an aiming line, positioning said transducer aiming lines from an initial position wherein said lines are coaxial to displaced positions in which said first transducer aiming line is displaced upstream with respect to said fluid flow, and said second transducer aiming line is displaced downstream with respect to said fluid flow, energizing said first transducer to generate a packet of ultrasound energy, sensing the output from said second transducer generated by receiving of said packet of ultrasound energy after said packet has passed across said fluid flow, varying the angles of said first and second transducer aiming lines thereby evaluating the downstream drift of said packet, and computing fluid velocity from said drift.

24. A method of measuring the velocity according to claim 23 wherein said transducers are oriented such that in said initial positions said aiming lines lie within a diametric center plane of said conduit.

25. A method of measuring the velocity according to claim 23 further comprising the step of positioning said second transducer upstream and said first transducer downstream and energizing said second transducer and sensing the output of said first transducer whereby the face surfaces of each of said transducers can be cleaned by said fluid flow.

26. A method of measuring the velocity according to claim 23 wherein said actuation means displaces said first and second transducers through of range of angles wherein said first transducer aiming line is displaced from said initial position and equal angle to the displacement of said second transducer aiming line from said initial position.

27. A method of measuring the velocity according to claim 23 wherein said first and second transducers are comprised of a plurality of individual piezoelectric elements and wherein the elements of said first transducer are activated with a phase difference to produce a steered beam and the signals from said second transducer elements are time delayed to assemble said beam.

* * * * *